United States Patent [19]

Kaye

[11] 4,265,984
[45] May 5, 1981

[54] BATTERY HOUSING

[75] Inventor: Gordon E. Kaye, Garrison, N.Y.

[73] Assignee: Duracell International Inc., Bethel, Conn.

[21] Appl. No.: 120,417

[22] Filed: Feb. 11, 1980

[51] Int. Cl.³ .............................................. H01M 2/02
[52] U.S. Cl. ..................................... 429/178; 429/151; 429/154; 429/176; 206/333
[58] Field of Search ........ 429/176, 160, 151, 153–155, 429/178; 206/333, 499

[56] References Cited

U.S. PATENT DOCUMENTS

| | | | |
|---|---|---|---|
| 2,697,128 | 12/1954 | Moore | 136/173 |
| 3,336,165 | 8/1967 | Brownlee | 136/173 |
| 3,575,725 | 4/1971 | Kaye | 136/108 |
| 3,726,717 | 10/1973 | Zaleski | 429/153 X |
| 3,933,522 | 1/1976 | Steig | 429/153 X |
| 4,123,598 | 10/1978 | Hammel | 429/176 X |

Primary Examiner—Charles F. LeFevour
Attorney, Agent, or Firm—Ronald S. Cornell; Israel Nissenbaum; Martin M. Glazer

[57] ABSTRACT

A battery housing formed of at least two sections. Two means of terminating the housing are associated with the housing. One means includes a terminal member and a conductive element. The element is substantially the same length as the housing. The second means includes a contact plate attached to the top cell in the housing. An aperture is provided through the housing and terminal member to permit a connector to reach the contact plate. The housing includes an integrally formed conduit which electrically insulates the conductive element.

12 Claims, 5 Drawing Figures

BATTERY HOUSING

FIELD OF THE INVENTION

This invention relates to battery housings and more particularly to a simple battery housing having novel terminals and an integral insulative conduit for an electrical conductor.

BACKGROUND OF THE INVENTION

Many devices employing electrochemical cells require a higher energy capacity and/or a higher voltage than can be satisfactorily supplied by a single cell. Higher voltages and energy capacities have been achieved by electrically interconnecting several cells. The interconnected cells can be contained within the device. Preferably the cells are contained within a separate battery housing, which housing is then connected to the device.

Many useful housings have been developed to contain the cells. The housing facilitate the handling of a plurality of cells by permitting them to be handled as a single unit. The housings further act to protect the cells from damage during handling and use, and serve as a base for means for terminating the battery.

Previously known battery housings, even though useful, have had many drawbacks. Chief among them, is the high manufacturing costs, relative to the cost of the cells. Expensive battery housings are particularly undesirable in primary batteries, which are intended as disposible items. High costs result from numerous componenents, many of which are relatively expensive to manufacture, and high labor costs generated by the necessity of employing skilled labor in the assembly of the numerous components. The means for terminating the battery add to the cost of the housings. The means have been composed generally of many parts with those parts requiring many manual steps for assembly into the housings.

Many heretofore known battery housings have suffered from unacceptable high rates of mechanical and electrical failure. The various internal structures, seams and terminals of the housings were subject to failure, principally due to the many mechanical forces applied to them by the cells during battery handling and use. These forces were most profound in housings containing large cells, whose weight amplified the destructive mechanical forces applied to the battery housings.

The internal electrical connections, (between cells, and from cells to external terminals) were subject to opening, or short circuiting. The electrical connections between the cells and the battery housing terminals generally cannot be eliminated. Further, a long internal conductor is required in housings having stacked cells and terminals, which for user convenience, are in close proximity to each other at one end of the housing. This long conductor, which electrically connects the far end of the cell stack and one terminal, is adjacent to all the cells of the battery. The failure of the insulation between the cells and the conductor will short circuit the battery, and possibly damage the cells. The failure of the conductor will cause the battery to cease functioning.

THE INVENTION

A new battery housing has now been discovered which is much less prone to mechanical or electrical failure than previously known battery housings, and which is easily assembled at low cost. The battery housing is comprised of at least two housing sections, first and second means for terminating the battery, and a conduit for insulating a portion of one means for terminating the battery. The conduit is integrally formed by the housing sections when they are joined to form the battery housing.

The invention will be more fully understood from the following drawings and disclosure.

DESCRIPTION OF THE DRAWINGS

Figure 1:
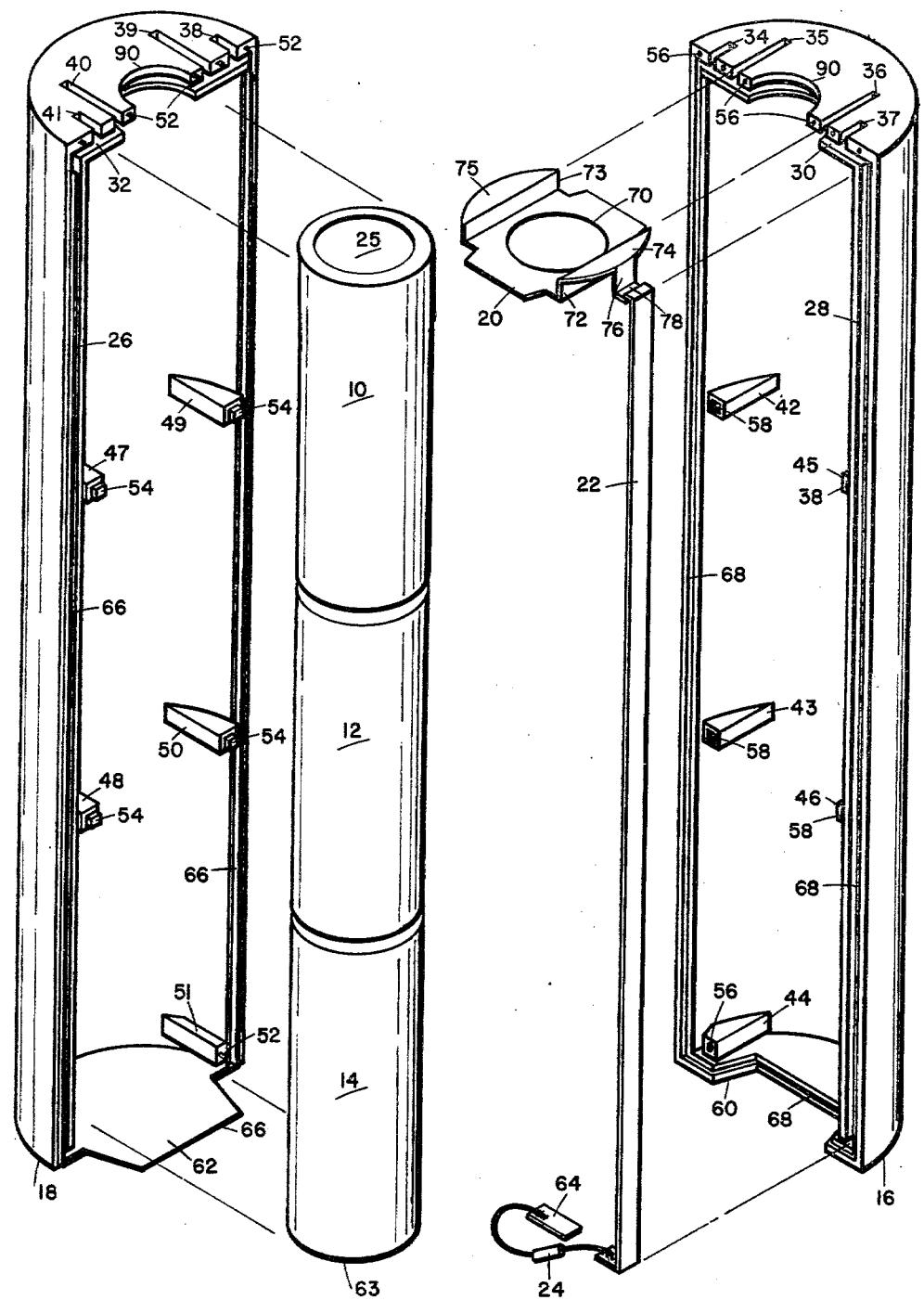
FIG. 1 is an exploded isometric view of a battery housing of the present invention.

A preferred battery is shown in FIG. 1. The battery is comprised of three cells 10, 12, 14, and a battery housing. The battery housing is comprised of two semicylinders 16 and 18; and first and second means for terminating the battery. The first means includes a first terminal member 20, a conductive element 22; and a fuse element 24. The second means includes a contact plate 25 at the top end of the first cell 10.

Figure 2:
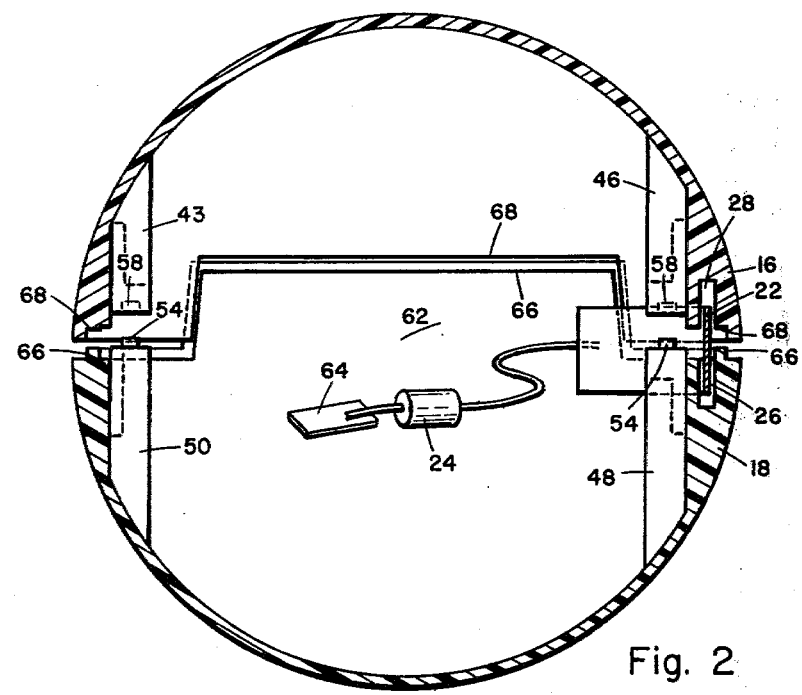
FIG. 2 is an enlarged, top cross sectional view of a battery housing, without cells, just before assembly, with the cross section taken at about the midpoint of the housing.

The battery housing, which is formed by the joining of the semicylinders 16 and 18 as shown in FIG. 2, permits the battery user to conveniently utilize the cells 10, 12, 14, manipulating only the battery housing, not the three individual cells 10, 12, 14. The battery housing provides physical and electrical protection for the cells 10, 12, 14. Further, the battery housing provides a support for the means for terminating the battery.

The semicylinders 16 and 18 of the present invention, which are preferably formed in a single step molding process, possess many novel features which reduce manufacturing costs and eliminate many of the drawbacks of previously known battery housings. One such feature is a pair of longitudunal recesses 26, 28 integral with each semicylinder 16, 18 respectively. The recesses 26, 28 are located on mating walls of the semicylinders 16, 18 and form a conduit on the joining of the semicylinders 16, 18 as shown in FIG. 2. The conduit is shown as having substantially the same length as the conductive member 22.

The conduit acts to electrically insulate the conductor 22 from the cells 10, 12, 14. The conduit, being preferably formed of the same relatively thick rigid material as the battery housing, is much more resistant to failure than previously used insulators, particularly those of the thin flexible types. Previously employed flexible materials, such as tapes or sheets, were subject to cracking and other failures. The insulation failures were causes of internal battery shorting, a serious problem with abuse sensitive cells, such as those having a lithium or light metal anode. Other previously used insulating methods not employing thin insulators were more resistant to failure, but were also more cumbersome to manufacture and consequently more expensive.

Each semicylinder 16, 18 is shown in FIG. 1, as having a slit 30, 32 respectively, located at one end of the battery housing. The slits 30, 32 run parallel to the top of the semicylinders 16, 18. Two pairs of rectangular slots 34, 35 and 36, 37 are shown as being perpendicular to the slit 30 and a second set of rectangular slots 38, 39 and 40, 41 are shown as perpendicular to the second slit 32. The rectangular slots 34 to 41 and slits 30, 32 which are of dimensions sufficient to accommodate the member 20, combine to form means for holding the preferred terminal member 20 within the battery holder on the joining of the semicylinders 16 and 18.

The preferred semicylinders 16 and 18 shown in FIG. 1, contain means to reinforce the battery housing. The means include six ribs 42 to 46 (one not shown) located on the first semicylinder 16, and six ribs 47 to 51 (one not shown) located on the second semicylinder. The ribs 47 to 51 project out, while ribs 42 to 46 are recessed inward. On the joining of the semicylinders 16 and 18, which is shown in FIG. 2, the seam of the joined ribs 43, 50 and 46, 48 is offset from the seam of the joined semicylinders 16 and 18. The joined ribs 42 to 51 act not only to structurally reinforce the housing, but also to reinforce the seam of the battery housing against lateral or shearing forces. The ribs 42 to 51 also act as spacers within the battery to hold the cells 10, 12, 14 in proper position and provide space between the cells 10, 12, 14 for the proper operation of any vents (not shown) located on the cells 10, 12, 14.

The seam formed at the top and sides of the battery housing is also reinforced against shearing forces by seven small cylindrical projections 52, six of which are located on one end of the second semicylinder 18 and one on rib 51; and by rectangular projections 54 located on the end of each rib 47 to 50. When the semicylinders 16, 18 are joined, the projections 52 and 54 enter mating receptacles 56 and 58 respectively, located on the first semicylinder 16 and the ends of the ribs 42 to 46 respectively. The cylindrical projections 52, rectangular projections 54 and mating receptacles 56 and 58 also act to properly align the housing sections 16, 18 during battery assembly.

The seam at the bottom of the battery housing is reinforced by a mortise 60 located on the first semicylinder 16 and a tenon 62 formed from the second semicylinder 18. The seam formed by the mortise 60 and tenon 62 is far more resistant to shearing forces than an unreinforced seam. Further, the longer seam produced is far stronger and resistant to other separating forces than a shorter straight seam that would be formed without the mortise 60 and tenon 62.

An important feature of the first semicylinder 16 is that it can function as a jig or platform for battery assembly. In a preferred method of battery assembly, the cells 10, 12 14 are first placed in the semicylinder 16 and are then interconnected, end to end, by the use of welded tabs (not shown), or the like. The conductor 22, which has been previously attached to the terminal member 20 at one end and the fuse element 24 at the other, is inserted into the longitudinal recess 28. The terminal member 20 is inserted into the lit 30 at the end of the semicylinder 16. The mortise 60 provides sufficient room to permit the end portion 64 of the fuse 24 to be easily attached to the exposed end 63 of the third cell 14. The second semicylinder 18 is then mated with the first semicylinder 16 and the two are then joined, as by gluing or preferably ultrasonic welding.

When the preferred method of ultrasonic welding is employed, an energy director or narrow ridge 66 is employed on three edges of the second semicylinder 18. A corresponding groove 68 is also used on the mating edges of the first semicylinder 16. The ridge 66 and groove 68 are united during the ultrasonic welding to form the desired seam.

The semicylinders 16, 18 with all their various features described herein are preferably formed in a single step molding operation, using molding techniques well known in the art. Such techniques permit the rapid, accurate and inexpensive manufacture of the semicylinders 16 and 18.

The semicylinders 16 and 18 are themselves preferably manufactured from a relatively rigid, insulative material. Examples of such materials include plastics such as ABS, acrylics, alkyl resins, epoxy resins, fluoroplastics, polycarbonates, polystyrene, phenolics, nylons, polyesters and silicones. A rigid material is desired, in that it protects and supports the cells 10, 12, 14, conductor 22, and means for terminating the battery.

Though the preferred embodiment of the present invention is described in terms of cylinder assembled from two semicylinders 16 and 18, as shown in FIGS. 1 and 2, the present invention is not thus limited. The present invention can be manufactured from more than two sections and/or in shapes different from those disclosed herein as being preferred. Consequently, battery housings having other shapes, such as rectangular, square or oval, and having the unique features disclosed herein are also within the scope of the present invention. Similarly, the means for terminating the battery, which includes terminal member 20 and contact plate 25 described hereafter and shown in FIGS. 1 and 3 to 5, are only the preferred embodiments. Variations of these means are also within the broad scope of the present invention.

One of the preferred means is shown in FIGS. 1 and 3 to 5 as being formed of a conductive member 20, a conductive element 22 and a fuse element 24. The member 20 and conductive element 22 are manufactured by methods well known in the art employing metals, such as plated steels or copper, as the preferred materials. The conductive element 22 which is shown as a tab, can also have the form of a wire or the like.

In FIG. 1, the member 20 is shown as having a central aperture 70. Integral with the left and right sides of the member 20 are two substantially vertical walls 72, 73, respectively. The walls 72, 73, which are substantially parallel to each other, project upward from the member 20. Semicircular walls 74, 75 project outwardly, substantially at right angles from the walls 72, 73 respectively. A second pair of substantially vertical parallel walls 76, 77 project downwardly from each semicircular wall 74, 75 (wall 77 shown in FIG. 4). A second pair of substantially horizontal walls 78, 79 project outwardly from the second vertical walls 76, 77, respectively (wall 79 shown in FIG. 5).

Figure 5:
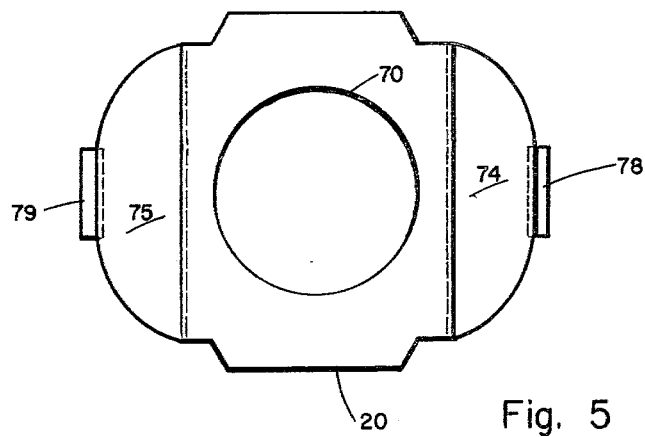
FIG. 5 is a top plan view of a terminal member.

The member 20, as can be seen in FIG. 5, is symmetrical left to right, and top to bottom. This symmetry permits the conductor 22 to be attached to either the left 79 or right 78 wall of the member 20, and permits the member 20 to be inserted into either slot 30 or 32.

Figure 4:
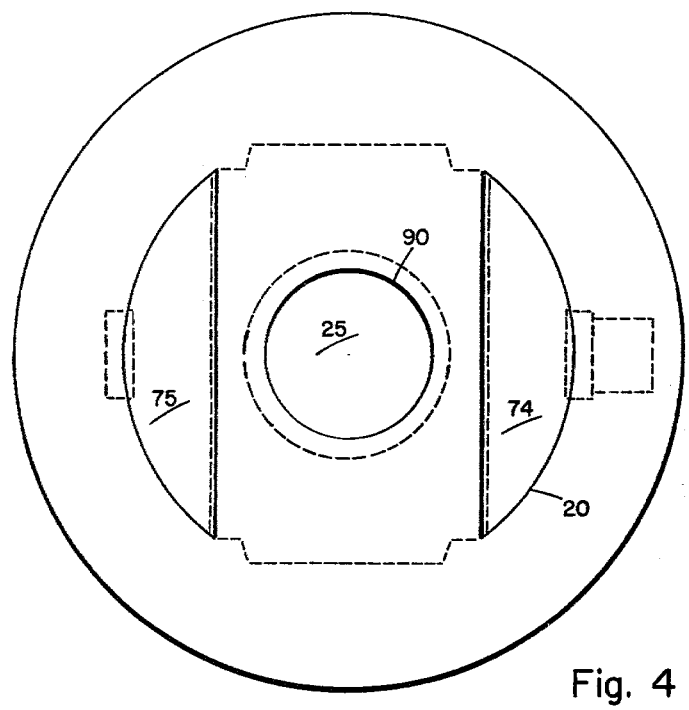
FIG. 4 is an enlarged top plan view of an assembled battery housing.
Figure 3:
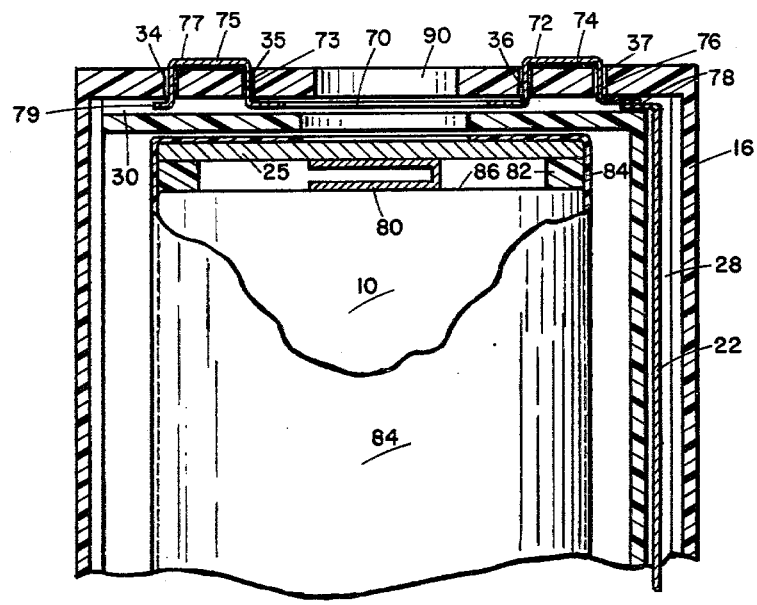
FIG. 3 is an enlarged cross sectional view of a top portion of the battery housing and of a second terminal.

As shown in FIGS. 3 and 4, upon the forming of the housing, the two semicircular 74, 75 of the member 20 rests on the top portion of the battery housing. The walls 74, 75 act as terminal contacts, permitting electrical contact with the cells 10, 12, 14 within the battery.

The top portion of the housing upon which the walls 74, 75 rest, acts to support the walls 74, 75. The supported walls 74, 75 can maintain their shape insuring continued good electrical contact and are also less subject to damage caused by the pressure of mating electrical contacts (not shown). The combination of slits 30, 32, rectangular slots 34-41 and the shape of the formed member 20 act to trap the member 20 within the housing, making it impossible to extract the member 20 from the housing and difficult to damage.

The means for terminating the battery also preferably include a fuse element 24. The fuse 24 is incorporated into the battery to prevent the forced discharge of the cells 10, 12, 14. The fuse 24 functions by opening the internal circuit of the battery if a quantity of current above a preset amount passes therethrough. Such protection is particularly desirable in batteries employing cells containing a light metal anode, as lithium, which cells can be damaged upon forced discharge.

In FIG. 3 the second means for terminating the battery is shown. The second means includes the contact plate 25, a connecting tab 80, an insulative washer 82 and a jacketing material 84. The second means is formed by modifying cell 10 of the battery. The contact plate 25, which is formed in a conventional way of a conductive material, should be sufficiently thick to prevent deformation by any connectors coming into contact with it. The contact plate 25 is electrically connected to the terminal or casing 86 of the cell 10 by a tab 80, which is preferably welded to the contact plate 25 and cell casing 86.

The contact plate 25 is held in place within the cell 10 by the pressure of a jacketing material 84, (shown partially cut away) which holds the plate 25 against a washer 82 on the end of the cell 10. The material 84 is preferably insulative and can be a shrink fit material, or any one of the other materials, well known in the art, capable of being adapted to hold the contact plate 25 in position.

As shown in FIG. 3, the aperture 70 of the preferred member 20 combined with a corresponding aperture 90 in the top portion of the battery housing permits a connector to pass therethrough and make contact with the contact plate 25 of the second means for terminating the battery.

The aperture 70 of the member 20 is larger than the aperture 90 of the housing. Such an arrangement prevents any electrical contact passing through the apertures 70, 90 from making contact with the member 20 and short circuiting the battery.

The location of the contacting plate 25 below the surface of the battery housing acts to prevent inadvertent short circuiting of the battery, while permitting the contact surfaces 25, 74, 75 of both means for terminating the battery to be located in close proximity to each other, on one end of the battery. If all contact surfaces 25, 74, 75 were located on the same level on the battery, placing a conductive item on the end of the battery or placing the battery on a conductive surface would cause the battery to short circuit. Further, in attempting to connect the battery to an electrical contact, the contact can bridge the means, short circuiting the battery and damaging the cells 10, 12, 14. Such bridging is impossible in the preferred embodiment.

The apertures 70, 90 further permit the use of connectors containing a mocroswitch. The apertures 70, 90 provide a channel which is desirable in the operation of these connectors. Microswitches are necessary for the proper operation of some types of microcircuits.

Another function of the appertures 70, 90 is that they provide an avenue of escape of any gasses generated within the battery. Such gasses can be produced on the venting of any of the cells 10, 12, 14. The apertures 70, 90 eliminate the need of using any other vents or venting systems.

Positive polarization of the battery is accomplished, in the preferred embodiment, by the use of the preferred means for terminating the battery. Electrical contact can only be made by using a pair of electrical connectors (not shown) specifically adapted to contact the means. Incorrect contact is impossible in that the connector which is adapted to make contact with the surfaces of walls 74, 75 cannot penetrate the apertures 70, 90 to contact the second terminal contact plate 25.

It is understood that the invention which has been described in terms of the preferred embodiment is not limited to that disclosed in the figures. Other embodiments, and variations of the preferred embodiment are also within the scope of the present invention as claimed in the following claims.

What is claimed is:

1. A battery housing for at least one cell comprising at least two electrically nonconductive housing sections joined together; first and second means for electrical terminating the housing operatively associated with said housing, said first means comprises a terminal member and conductive element, which conductive element is substantially the same length as the housing; and a conduit integrally formed from the two housing sections for electrically insulating the conductive element.

2. The battery housing of claim 1 comprised of two electrically nonconductive housing sections.

3. The battery housing of claim 2 wherein the terminal member comprises a substantially planar element having an aperture; a substantially vertical wall projecting upwardly from one edge of the member; a second substantially vertical wall, substantially parallel to the first wall, projecting upwardly from a second edge of the member; a substantially horizontal wall projecting outwardly from each vertical wall; a third substantially vertical wall projecting downwardly from each horizontal wall; and a fourth wall projecting substantially outwardly from each horizontal wall; and wherein the battery housing further comprises a mating wall in each housing section having a slit therein, and two pairs of slots substantially perpendicular to each slit providing a path from the slit to the outer surface of the wall, wherein the slits and slots are sized to accommodate the terminal member.

4. The battery housing of claim 1 wherein the second means for terminating the battery housing comprises a wall in the housing having an aperture, the terminal member having a aperture concentric with, and larger than that in the housing wall, and a cell terminal operatively associated with the apertures.

5. The battery housing of claim 4 wherein the cell terminal comprises a contact plate electrically connected to the cell, and means for holding the contact plate in place on the cell.

6. The battery housing of claim 1 and further comprising means for aligning and reinforcing the battery housing sections.

7. The battery housing of claim 6 wherein the means comprise a plurality of projections on a housing section, and on a mating housing section a plurality of mating recesses.

8. The battery housing of claim 6 wherein the means comprise ribs projecting out beyond a mating edge of one housing section, and mating ribs recessed inward below the mating edge of the second housing section.

9. The battery housing of claim 6 wherein the means comprise one wall of one housing section having the form of a tenon and a mating wall on the second housing section having a mortise.

10. The battery housing of claim 1 wherein said first means for electrically terminating the battery further comprises means for opening the terminating means upon the abusive discharge of the cell.

11. The battery housing of claim 10 wherein the means for opening the terminating means comprises a fuse in series with the terminal member and conductive element.

12. A battery comprised of the battery housing of claim 1 and at lease one electrochemical cell.

* * * * *